United States Patent
Bösch et al.

(10) Patent No.: US 12,202,495 B2
(45) Date of Patent: Jan. 21, 2025

(54) DEVICE FOR CONTROLLING AN AUTOMATED DRIVING OPERATION OF A VEHICLE

(71) Applicants: Mercedes-Benz Group AG, Stuttgart (DE); Robert Bosch GmbH, Stuttgart (DE)

(72) Inventors: Peter Bösch, Leonberg (DE); Jinglei Wu, Stuttgart (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 344 days.

(21) Appl. No.: 17/755,685

(22) PCT Filed: Oct. 19, 2020

(86) PCT No.: PCT/EP2020/079337
§ 371 (c)(1),
(2) Date: Aug. 25, 2022

(87) PCT Pub. No.: WO2021/089307
PCT Pub. Date: May 14, 2021

(65) Prior Publication Data
US 2022/0396276 A1     Dec. 15, 2022

(30) Foreign Application Priority Data
Nov. 7, 2019    (DE) .................... 10 2019 130 036.3

(51) Int. Cl.
*B60W 50/023* (2012.01)
*B60R 16/023* (2006.01)
(Continued)

(52) U.S. Cl.
CPC .......... *B60W 50/023* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS

| 7,289,889 B2 * | 10/2007 | Naik .................. B60W 50/023 |
| | | 701/1 |
| 9,195,232 B1 | 11/2015 | Egnor et al. |

(Continued)

FOREIGN PATENT DOCUMENTS

| DE | 19526250 A1 | 1/1997 |
| DE | 102017010716 A1 | 5/2019 |

OTHER PUBLICATIONS

European Patent Office, International Search Report and Written Opinion in Application No. PCT/EP2020/079337, dated Jan. 22, 2021, 13 pages, Rijswijk Netherlands.

(Continued)

*Primary Examiner* — Todd Melton
(74) *Attorney, Agent, or Firm* — Marshall & Melhorn, LLC

(57) ABSTRACT

A device for controlling an automated driving operation of a vehicle may have at least two brake systems, at least two steering systems, an engine controller, a first automated drive controller, a second automated drive controller, a surroundings sensor assembly, and inertial sensors. A third automated drive controller at least controls the vehicle into a standstill. The device is configured such that the automated driving operation is initiated and/or maintained only when the brake systems, steering systems, and at least two of the automated drive controllers are functional and such that the automated driving operation is interrupted if only one of the automated drive controllers is functional and/or if one of the brake systems and/or steering systems is not functional and/or if the engine controller is not functional, in which (Continued)

case the still functional automated drive controller assumes control of the vehicle and guides the vehicle into a standstill.

15 Claims, 2 Drawing Sheets

(51) Int. Cl.
*B60W 10/06* (2006.01)
*B60W 10/18* (2012.01)
*B60W 10/20* (2006.01)
*B60W 60/00* (2020.01)

(52) U.S. Cl.
CPC ......... *B60W 10/20* (2013.01); *B60R 16/0231* (2013.01); *B60W 60/00186* (2020.02); *B60W 2520/06* (2013.01); *B60W 2520/105* (2013.01); *B60W 2710/06* (2013.01); *B60W 2710/18* (2013.01); *B60W 2710/20* (2013.01)

(56) References Cited

U.S. PATENT DOCUMENTS

| 11,157,374 B2* | 10/2021 | Menon | B60W 50/0205 |
| 2018/0370540 A1 | 12/2018 | Yousuf et al. | |
| 2021/0163021 A1* | 6/2021 | Frazzoli | H04W 4/48 |

OTHER PUBLICATIONS

German Patent and Trade Mark Office, Office Action in Application No. DE102019130036.3. dated May 31, 2024, 22 pages.

* cited by examiner

DEVICE FOR CONTROLLING AN AUTOMATED DRIVING OPERATION OF A VEHICLE

FIELD

The invention concerns an equipment arrangement for controlling the automated driving operation of a vehicle.

BACKGROUND

Simple redundancy in automated driving control devices (ADC—automated drive controller) is known from the prior art. With simple redundancy, each individual failure of an essential component of the AD kit triggers a fallback level that initiates an immediate stop (Degradation Level 1). Due to the complex architecture, it is possible for these fallback levels to be necessary and cause "breakdowns" very frequently. A second fallback level providing an emergency stop for double failures is included in the brake system (EBS) (Degradation Level 2).

SUMMARY

The invention's goal is to provide an improved equipment arrangement for controlling the automated driving operation of a vehicle.

This goal is achieved with the invented equipment arrangement as in the claims.

Advantageous embodiments of the invention are the object of the subordinate claims.

An equipment arrangement for controlling the automated driving operation of a vehicle according to the invention includes at least two brake systems, at least two steering systems, an engine controller, a first automated drive controller and a second automated drive controller, a surroundings sensor assembly, and inertial sensors, wherein the automated drive controllers are designed to be redundant and are configured to plan a trajectory for the vehicle based on signals from the surroundings sensor assembly and from the inertial sensors, generate acceleration and steering angle target values required to traverse the planned trajectory, and supply those target values to the brake systems, steering systems, and engine controller. According to the invention, a third automated drive controller is provided which is designed to at least control the vehicle to a standstill, and the equipment arrangement is configured such that automated driving operation is initiated and/or maintained only when the brake systems, steering systems, and at least two of the automated drive controllers are functional, and such that automated driving operation is interrupted if only one of the automated drive controllers is functional and/or if one of the brake systems and/or steering systems and/or the engine controller is not functional, in which case the remaining functional automated drive controller assumes control of the vehicle and guides the vehicle to a standstill.

In order to achieve high functional certainty, the equipment arrangement includes multiple controllers, multiple steering systems, and multiple brake systems. The controllers plan a trajectory based on various sensor signals and generate acceleration target values and a steering angle target value for traversing the planned trajectory. These target values are applied by the steering and brake systems and by an engine controller on the vehicle. The engine controller is designed to transfer a target torque value, specified by the brake system, to a drive unit (combustion engine/electric motor) of the vehicle.

According to the invention, at least three controllers are provided, one of which is designed as an additional controller exclusively for guiding the vehicle to a standstill, with the remaining controllers designed as primary controllers for automated vehicle guidance. Automated driving operation is then initiated and maintained only and for as long as the steering and brake systems and at least two of the controllers are functional. If only one of the controllers is functional or if one of the steering or brake systems or the engine controller is no longer functional, automated driving operation is interrupted and the remaining functional controller assumes control of the vehicle and guides it to a standstill.

Adding a third separate automated drive controller (ADC) to the usual two primary automated drive controllers can dramatically increase the availability of the overall system and provide greater safety with respect to common-cause or systematic failures in the two primary automated drive controllers. The quality and reliability of the two fallback levels can be significantly improved through the use of the surroundings sensor assembly in those fallback levels. The overall degradation concept is also significantly improved by adding to those fallback levels.

Expanding the degradation concept with an additional fallback level results in the following advantages:
- Increased availability (non-availability reduced by approximately half) of automated driving function,
- Qualitatively high fallback levels also available for double failures or systematic failures,
- Steering reliability ensured for every individual failure, and
- Minimal likelihood of emergency stopping by the brake system (last fallback level).

In one embodiment of the invention, the third automated drive controller is designed exclusively for guiding the vehicle to a standstill. The additional third automated drive controller is, for example, a secondary controller with a smaller range of functions than the automated drive controllers designed as the primary controllers. The additional third automated drive controller can therefore also be manufactured at a lower cost than the automated drive controllers. The third automated drive controller in this embodiment of the invention is not designed to continue automated driving operation. The third automated drive controller is designed exclusively for guiding the vehicle safely to a standstill. Preferably the standstill should be reached in the safest possible location, on the side of the road, for example.

In one embodiment of the invention, the two brake systems are redundant to each other and/or the two steering systems are redundant to each other.

In one embodiment of the invention, the two brake systems and one of the steering systems are connected to a first actuator bus and linked to the first automated drive controller, and/or both brake systems and another of the steering systems are connected to a second actuator bus and linked to the second automated drive controller.

In one embodiment of the invention, the first automated drive controller and the second automated drive controller are linked to each other through a motion sensor bus and to a first motion sensor cluster, and/or a second motion sensor cluster is connected to the second actuator bus.

In one embodiment of the invention, the third automated drive controller is connected to the first actuator bus and to the second actuator bus.

In one embodiment of the invention, a first power supply unit is provided to supply power to one of the steering systems and one of the brake systems, and/or a second power supply unit is provided to supply power to the first automated drive controller and the first motion sensor cluster, and/or a third power supply unit is provided to supply power to another of the brake systems, another of the steering systems, the second automated drive controller, and the second motion-sensor cluster.

The third automated drive controller can be connected to the first power supply unit or the second power supply unit or the third power supply unit or to a fourth power supply unit.

In one embodiment of the invention, the third automated drive controller, designed as a secondary controller, and the two first and second automated drive controllers, designed as primary controllers, are designed to access the surroundings sensor assembly through a sensor COM bus.

Examples of the invention are explained in more detail below, with reference to figures.

DETAILED DESCRIPTION

The same items are marked with the same references in all figures.

Figure 1:
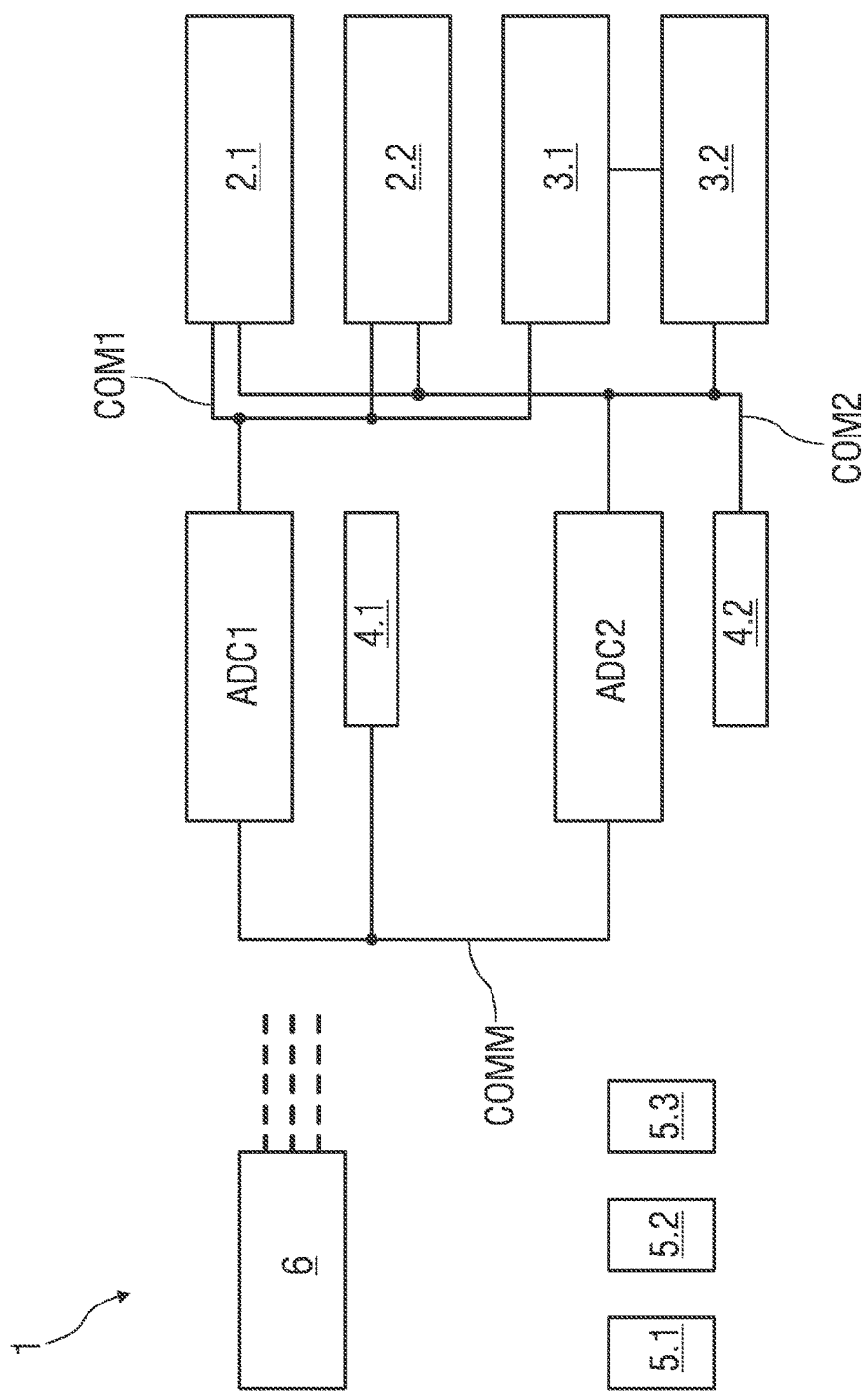
FIG. 1 a schematic view of an equipment arrangement for controlling the automated driving operation of a vehicle according to the prior art, and FIG. 2 a schematic view of an equipment arrangement for controlling the automated driving operation of a vehicle according to the invention.

FIG. 1 shows a schematic view of an equipment arrangement 1 for controlling the automated driving operation of a vehicle according to the prior art.

The equipment arrangement 1 includes a first brake system 2.1 and a second brake system 2.2, which are redundant to each other. In addition, a first steering system 3.1 and a second steering system 3.2 are provided, which are redundant to each other. The first brake system 2.1, the second brake system 2.2, and the first steering system 3.1 are connected to a first actuator bus COM1 and linked to a first automated drive controller ADC1. In addition, the first brake system 2.1 and the second steering system 3.2 are connected to a second actuator bus COM2 and linked to a second automated drive controller ADC2. The first automated drive controller ADC1 and the second automated drive controller ADC2 are linked to each other through a motion sensor bus COMM and to a first motion sensor cluster 4.1. A second motion sensor cluster 4.2 is connected to the second actuator bus COM2.

A first power supply unit 5.1 supplies power to the first steering system 3.1 and the second brake system 2.2. A second power supply unit 5.2 supplies power to the first automated drive controller ADC1 and the first motion sensor cluster 4.1. A third power supply unit 5.3 supplies power to the first brake system 2.1, the second steering system 3.2, the second automated drive controller ADC2, and the second motion sensor cluster 4.2.

A surroundings sensor assembly 6 contains a surroundings sensor array, including, for example, one or more radar sensors, Lidar sensors, and cameras, whose signals are transmitted to the automated drive controllers ADC1, ADC2, through a sensor COM bus, for example.

Each of the motion sensor clusters 4.1, 4.2 contains an inertial sensor array, including three rotational rate sensors and three inertial sensors for three coordinate axes each. A DGNSS (differential global navigation satellite system) sensor array is housed in a suitable location, in one of the motion sensor clusters 4.1, 4.2, for example, for satellite-supported location determination.

The automated drive controllers ADC1, ADC2 are designed to be redundant. They work in parallel and perform the same functions: Based on the signals from the sensors in the surroundings sensor assembly 6, inertial sensors in the motion sensor clusters 4.1, 4.2, and DGNSS sensors, they plan a trajectory to be automatically followed by the vehicle and determine the necessary acceleration and steering angle target values for driving the planned trajectory.

The acceleration target values are transmitted to the redundantly designed brake systems 2.1, 2.2 and to an engine controller, not shown. The engine controller can, but does not have to be, designed with redundancy. The engine controller converts positive and some negative acceleration target values into drive torque or regenerative torque, and the brake systems 2.1, 2.2 convert negative acceleration target values (i.e., deceleration values) into braking torques for the vehicle's brakes.

Steering angle target values are transmitted to the steering systems 3.1, 3.2, which are also designed to be redundant, and control the steering angle of the vehicle's steerable wheels.

The two steering systems 3.1, 3.2 work together. They are designed so that they can also perform their functions alone, i.e., if one of the steering systems 3.1, 3.2 fails, the other still-functioning steering system 3.1, 3.2 continues working alone. However, it then has to do more work. The still-functioning steering system 3.1, 3.2 recognizes the failure of the other steering system 3.1, 3.2 when the other steering system 3.1, 3.2 stops sending position signals for the steering actuators. The functioning steering system 3.1, 3.2 reports the failure of the other steering system 3.1, 3.2 to both of the automated drive controllers ADC1, ADC2, so that they can make a decision about continued driving operation.

The two brake systems 2.1, 2.2 work together. They are designed so that they can also perform their functions alone, i.e., if one of the brake systems 2.1, 2.2 fails, the still-functioning brake system 2.1, 2.2 continues working alone. However, it then has to do more work. The still-functioning brake system 2.1, 2.2 recognizes the failure of the other brake system 2.1, 2.2 when the other brake system 2.1, 2.2 stops sending position signals for the brake actuators. The functioning brake system 2.1, 2.2 reports the failure of the other brake system 2.1, 2.2 to the automated drive controllers ADC1, ADC2, so that they can make a decision about continued driving operation. In one embodiment of the invention, the first brake system 2.1 can include an electronic stability program. The second brake system 2.2 can include an electronic braking power booster.

Because the two automated drive controllers ADC1, ADC2 work in parallel, when they are fully operational they also provide the respective target values, and when generated these values fall within a predetermined validity range. The brake systems 2.1, 2.2 and steering systems 3.1, 3.2 recognize this, and in such a case they initiate steering or braking regardless of the basis for the target values coming from one of the automated drive controllers ADC1, ADC2. The target values from the other automated drive controller ADC1, ADC2 are disregarded with respect to initiating steering or braking. If one of the automated drive controllers ADC1, ADC2 delivers no target values or delivers invalid (falling outside of the validity range) target values, a failure of the respective automated drive controller ADC1, ADC2 is assumed and a corresponding message is sent to the still-functioning automated drive controller ADC1, ADC2.

If one of the steering systems 3.1, 3.2 or brake systems 2.1, 2.2 fails, the vehicle is brought safely to a standstill using the still-functioning systems 2.1, 2.2, 3.1, 3.2. In this case, the standstill occurs in the safest possible position, such as on the side of the road.

The same occurs if one of the automated drive controllers ADC1, ADC2 fails, regardless of whether it is due to an internal failure in one of the automated drive controllers ADC1, ADC2, failure of a power supply unit 5.1, 5.2, 5.3, or failure of one of the actuator busses COM1, COM2. This means that the vehicle is stopped when the first automated drive controller ADC1 fails, even though the second automated drive controller ADC2 is still fully functional and automated driving could continue. Automated driving is only permitted when there is redundancy, and this is no longer the case if the first automated drive controller ADC1 fails. The same occurs if the second automated drive controller ADC2 fails and the first automated drive controller ADC1 is still fully functional.

Figure 2:
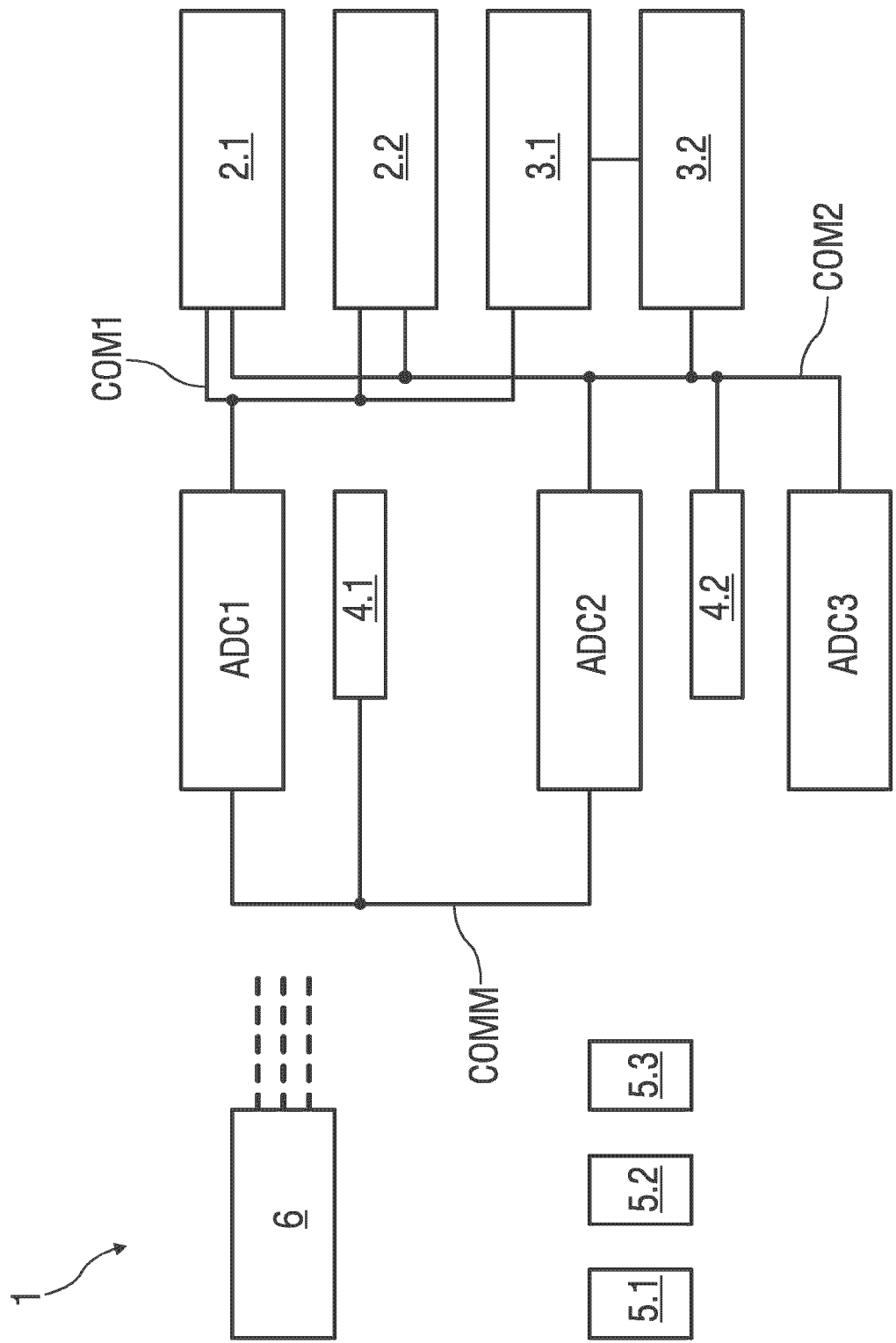

If both automated drive controllers ADC1 and ADC2 fail, the vehicle is guided and braked to a standstill using the first brake system 2.1. In such a case, the first brake system 2.1, based on signals from the inertial sensors in the second motion sensor cluster 4.2, executes lateral dynamic control (by initiating steering [steering angle control]) in order to keep the vehicle stable in its lane during the braking process. FIG. 2 shows a schematic view of an equipment arrangement 1 according to the invention for controlling the automated driving operation of a vehicle.

The equipment arrangement 1 includes a first brake system 2.1 and a second brake system 2.2, which are redundant to each other. In addition, a first steering system 3.1 and a second steering system 3.2 are provided, which are redundant to each other. The first brake system 2.1, the second brake system 2.2, and the first steering system 3.1 are connected to a first actuator bus COM1 and linked to a first automated drive controller ADC1. In addition, the first brake system 2.1, the second brake system 2.2, and the second steering system 3.2 are connected to a second actuator bus COM2 and linked to a second automated drive controller ADC2. The first automated drive controller ADC1 and the second automated drive controller ADC2 are linked to each other through a motion sensor bus COMM and to a first motion sensor cluster 4.1. A second motion sensor cluster 4.2 is connected to the second actuator bus COM2.

In addition, a third automated drive controller ADC3 is provided, which is connected to the first actuator bus COM1 and to the second actuator bus COM2 and to which the signals from the second motion sensor cluster 4.2 are also available.

A first power supply unit 5.1 supplies power to the first steering system 3.1, the second brake system 2.2, and the third automated drive controller ADC3. A second power supply unit 5.2 supplies power to the first automated drive controller ADC1 and the first motion sensor cluster 4.1. A third power supply unit 5.3 supplies power to the first brake system 2.1, the second steering system 3.2, the second automated drive controller ADC2, and the second motion sensor cluster 4.2. The power supply for the third automated drive controller ADC3 can also come from any of the other power supply units 5.2, 5.3 or from one of the other four power supply units.

A surroundings sensor assembly 6 contains a surroundings sensor array, including, for example, one or more radar sensors, Lidar sensors, and cameras, whose signals are transmitted to the automated drive controllers ADC1, ADC2, ADC3.

Each of the motion sensor clusters 4.1, 4.2 contains an inertial sensor array, including three rotational rate sensors and three inertial sensors for three coordinate axes each. A DGNSS (differential global navigation satellite system) sensor array is housed in a suitable location, in one of the motion sensor clusters 4.1, 4.2, for example, for satellite-supported location determination.

The automated drive controllers ADC1, ADC2 are the primary controllers. They are designed to be redundant. They work in parallel and perform the same functions: Based on the signals from the sensors in the surroundings sensor assembly 6, inertial sensors in the motion sensor clusters 4.1, 4.2, and DGNSS sensors, they plan a trajectory to be automatically followed by the vehicle and determine the necessary acceleration and steering angle target values for driving the planned trajectory. The additional third automated drive controller ADC3 is a secondary controller with a smaller range of functions than the automated drive controllers ADC1, ADC2 designed as the primary controllers. The additional third automated drive controller ADC3 can therefore also be manufactured at a lower cost than the automated drive controllers ADC1, ADC2. The third automated drive controller ADC3 is not designed to continue automated driving operation. The third automated drive controller ADC3 is designed exclusively for guiding the vehicle safely to a standstill. In this case, the standstill occurs in the safest possible position, such as on the side of the road.

The acceleration target values are transmitted to the redundantly designed brake systems 2.1, 2.2 and to an engine controller, not shown. The engine controller can, but does not have to be, designed with redundancy. The engine controller converts positive and some negative acceleration target values into drive torque or regenerative torque, and the brake systems 2.1, 2.2 convert negative acceleration target values (i.e., deceleration values) into braking torques for the vehicle's brakes.

Steering angle target values are transmitted to the steering systems 3.1, 3.2, which are also designed to be redundant, and control the steering angle of the vehicle's steerable wheels.

The two steering systems 3.1, 3.2 work together. They are designed so that they can also perform their functions alone, i.e., if one of the steering systems 3.1, 3.2 fails, the other still-functioning steering system 3.1, 3.2 continues working alone. However, it then has to do more work. The still-functioning steering system 3.1, 3.2 recognizes the failure of the other steering system 3.1, 3.2 when the other steering system 3.1, 3.2 stops sending position signals for the steering actuators. The functioning steering system 3.1, 3.2 reports the failure of the other steering system 3.1, 3.2 to both of the automated drive controllers ADC1, ADC2, so that they can make a decision about continued driving operation.

The two brake systems 2.1, 2.2 work together. They are designed so that they can also perform their functions alone, i.e., if one of the brake systems 2.1, 2.2 fails, the still-functioning brake system 2.1, 2.2 continues working alone. However, it then has to do more work. The still-functioning brake system 2.1, 2.2 recognizes the failure of the other brake system 2.1, 2.2 when the other brake system 2.1, 2.2 stops sending position signals for the brake actuators. The functioning brake system 2.1, 2.2 reports the failure of the other brake system 2.1, 2.2 to the automated drive controllers ADC1, ADC2, so that they can make a decision about continued driving operation. In one embodiment of the invention, the first brake system 2.1 can include an electronic stability program. The second brake system 2.2 can include an electronic braking power booster.

Because the two automated drive controllers ADC1, ADC2 work in parallel, when they are fully operational they also provide the respective target values, and when generated these values fall within a predetermined validity range. The brake systems 2.1, 2.2 and steering systems 3.1, 3.2 recognize this, and in such a case they initiate steering or braking regardless of the basis for the target values coming from one of the automated drive controllers ADC1, ADC2. The target values from the other automated drive controller ADC1, ADC2 are disregarded with respect to initiating steering or braking. If one of the automated drive controllers ADC1, ADC2 delivers no target values or delivers invalid (falling outside of the validity range) target values, a failure of the respective automated drive controller ADC1, ADC2 is assumed and a corresponding message is sent to the still-functioning automated drive controller ADC1, ADC2.

If one of the steering systems 3.1, 3.2 or brake systems 2.1, 2.2 fails, the vehicle is brought safely to a standstill using the still-functioning systems 2.1, 2.2, 3.1, 3.2. In this case, the standstill occurs in the safest possible position, such as on the side of the road.

If one of the automated drive controllers ADC1, ADC2 fails, regardless of whether it is due to an internal failure in one of the automated drive controllers ADC1, ADC2, failure of a power supply unit 5.1, 5.2, 5.3, or failure of one of the actuator busses COM1, COM2, then the automated drive controller ADC1, ADC2 that has not failed takes over the steering functions and automated driving of the vehicle continues (first fallback level: continued automated driving operation). The additional third automated drive controller ADC3 is available as an additional safety device which, in the event of an additional failure of the automated drive controller ADC1, ADC2 that until then had not failed, takes over the steering of the vehicle and brakes it to a standstill (second fallback level: termination of automated driving operation). Therefore, failure of one of the two automated drive controllers ADC1, ADC2 designed as primary controllers does not cause the vehicle to "shut down" as long as the automated drive controller ADC3, designed as a secondary controller, is still functional.

If both automated drive controllers ADC1 and ADC2 fail, the third automated drive controller ADC3 takes control and brakes the vehicle safely to a standstill using the still-functioning systems. In this case, the standstill occurs in the safest possible position, such as on the side of the road.

If both of the automated drive controllers ADC1 and ADC2, designed as primary controllers, fail and the third automated drive controller ADC3, designed as a secondary controller, also fails, the vehicle is guided and braked to a standstill using the first brake system 2.1. In such a case, the first brake system 2.1, based on signals from the inertial sensors in the second motion sensor cluster 4.2, executes lateral dynamic control (by initiating steering [steering angle control]) in order to keep the vehicle stable in its lane during the braking process.

If one of the automated drive controllers ADC1 or ADC2, designed as a primary controller, fails and the third automated drive controller ADC3, designed as a secondary controller, also fails, the automated drive controllers ADC1 or ADC2, designed as a primary controller, that has not failed takes control and guides the vehicle to a standstill. Automated driving is not continued in this case.

If the third automated drive controller ADC3, designed as a secondary controller, fails, the automated drive controller ADC1, designed as a primary controller, remains in control and the vehicle continues its automated driving (first fallback level: continued automated driving operation). The second automated drive controller ADC2, designed as a primary controller, is available as an additional safety device which, in the event of an additional failure of the first automated drive controller ADC1, takes over the steering of the vehicle and brakes it to a standstill (second fallback level: termination of automated driving operation). Therefore, failure of a third automated drive controller ADC3, designed as a secondary controller, does not cause the vehicle to "shut down" as long as both of the automated drive controllers ADC1 and ADC2, designed as primary controllers, are still functional.

In one embodiment of the invention, the third automated drive controller ADC3, designed as a secondary controller, can alternatively or additionally be connected to the first actuator bus COM1. The power supply for the third automated drive controller ADC3, designed as a secondary controller, can alternatively also come from one of the other two power supply units 5.1, 5.3. As an additional possibility to further increase availability, an additional fourth onboard power supply can also be used. In addition to the two automated drive controllers ADC1, ADC2, designed as primary controllers, the third automated drive controller ADC3, designed as a secondary controller, also has access to the entire sensor array of the surroundings sensor assembly 6, through a sensor COM bus, for example.

LIST OF REFERENCE INDICATORS

1 Equipment arrangement
2.1 First brake system
2.2 Second brake system
3.1 First steering system
3.2 Second steering system
4.1 First motion sensor cluster
4.2 Second motion sensor cluster
5.1 First power supply unit
5.2 Second power supply unit
5.3 Third power supply unit
6 Surroundings sensor assembly
ADC1 First automated drive controller
ADC2 Second automated drive controller
ADC3 Third automated drive controller
COM1 First actuator bus
COM2 Second actuator bus
COMM Motion sensor bus

The invention claimed is:

1. An equipment arrangement for controlling the automated driving operation of a vehicle, comprising:
at least two brake systems,
at least two steering systems,
wherein a first power supply unit is provided to supply power to one of the at least two steering systems and one of the at least two brake systems,
an engine controller,
a first automated drive controller and a second automated drive controller,
a surroundings sensor assembly, and
inertial sensors,
wherein the automated drive controllers are designed to be redundant and are configured to plan a trajectory for the vehicle, based on signals from the surroundings sensor assembly and from the inertial sensors, and generate acceleration and steering angle target values needed in order to traverse the planned trajectory, and supply them to the brake systems, steering systems, and engine controller, wherein a third automated drive controller is provided which is designed to at least control the vehicle to a standstill, and the equipment arrangement is configured such that automated driving operation is one of initiated and maintained only when the brake systems, steering systems, and at least two of the automated drive controllers are functional, and such that automated driving operation is interrupted if at least one of the following conditions applies:

only one of the automated drive controllers is functional, at least one of the brake systems and steering systems and the engine controller is not functional, in which case the remaining functional automated drive controller assumes control of the vehicle and guides the vehicle to a standstill.

2. The equipment arrangement as in claim 1, wherein the third automated drive controller is designed exclusively for guiding the vehicle to a standstill.

3. The equipment arrangement as in claim 1, wherein the at least two brake systems are redundant to each other.

4. The equipment arrangement as in claim 1, wherein the at least two steering systems are redundant to each other.

5. The equipment arrangement as in claim 1, wherein the at least two brake systems and one of the at least two steering systems are connected to a first actuator bus and linked to the first automated drive controller.

6. The equipment arrangement as in claim 5, wherein both of the at least two brake systems and a second of the at least two steering systems are connected to a second actuator bus and linked to the second automated drive controller.

7. The equipment arrangement as in claim 6, wherein the first automated drive controller and the second automated drive controller are linked to each other through a motion sensor bus and to a first motion sensor cluster.

8. The equipment arrangement as in claim 7, wherein a second motion sensor cluster is connected to the second actuator bus.

9. The equipment arrangement as in claim 8, wherein a third power supply unit is provided to supply power to the second of the at least two brake systems, the second of the at least two steering systems, the second automated drive controller, and the second motion-sensor cluster.

10. The equipment arrangement as in claim 9, wherein a second power supply unit is provided to supply power to the first automated drive controller and the first motion sensor cluster, wherein the third power supply unit is provided to supply power to the second of the at least two brake systems, the second of the at least two steering systems, the second automated drive controller, and the second motion-sensor cluster, wherein the third automated drive controller is connected to one of the first power supply unit, the second power supply unit, the third power supply unit, and a fourth power supply unit.

11. The equipment arrangement as in claim 7, wherein a second power supply unit is provided to supply power to the first automated drive controller and the first motion sensor cluster.

12. The equipment arrangement as in claim 6, wherein both of the at least two brake systems and the second of the at least two steering systems are connected to the second actuator bus and linked to the second automated drive controller, wherein the third automated drive controller is connected to the first actuator bus and to the second actuator bus.

13. The equipment arrangement as in claim 1, wherein the third automated drive controller, designed as a secondary controller, and the two first and second automated drive controllers, designed as primary controllers, are designed to access the surroundings sensor assembly through a sensor COM bus.

14. An equipment arrangement for controlling the automated driving operation of a vehicle, comprising:

at least two brake systems,
at least two steering systems,
an engine controller,
a first automated drive controller and a second automated drive controller,
a surroundings sensor assembly,
a first power supply unit,
a second power supply unit, and
inertial sensors, wherein the automated drive controllers are designed to be redundant and are configured to plan a trajectory for the vehicle, based on signals from the surroundings sensor assembly and from the inertial sensors, and generate acceleration and steering angle target values needed in order to traverse the planned trajectory, and supply them to the brake systems, steering systems, and engine controller, wherein the second power supply unit is provided to supply power to the first automated drive controller and a first motion sensor cluster, wherein a third automated drive controller is provided which is designed to at least control the vehicle to a standstill, and the equipment arrangement is configured such that automated driving operation is one of initiated and maintained only when the brake systems, steering systems, and at least two of the automated drive controllers are functional, and such that automated driving operation is interrupted if at least one of the following conditions applies:

only one of the automated drive controllers is functional, at least one of the brake systems and steering systems and the engine controller is not functional, in which case the remaining functional automated drive controller assumes control of the vehicle and guides the vehicle to a standstill.

15. An equipment arrangement for controlling the automated driving operation of a vehicle, comprising:

at least two brake systems,
at least two steering systems,
an engine controller,
a first automated drive controller and a second automated drive controller,
a surroundings sensor assembly,
a first power supply unit,
a second power supply unit
a third power supply unit, and
inertial sensors, wherein the automated drive controllers are designed to be redundant and are configured to plan a trajectory for the vehicle, based on signals from the surroundings sensor assembly and from the inertial sensors, and generate acceleration and steering angle target values needed in order to traverse the planned trajectory, and supply them to the brake systems, steering systems, and engine controller, wherein the second power supply unit is provided to supply power to the first automated drive controller and a first motion sensor cluster, wherein the third power supply unit is provided to supply power to the second of the at least two brake systems, the second of the at least two steering systems, the second automated drive controller, and a second motion-sensor cluster, wherein a third automated drive controller is provided which is designed to at least control the vehicle to a standstill, and the equipment arrangement is configured such that automated driving operation is one of initiated and maintained only when the brake systems, steering systems, and at least two of the automated drive controllers are functional, and such that automated driving operation is interrupted if at least one of the following conditions applies:

only one of the automated drive controllers is functional, at least one of the brake systems and steering systems and the engine controller is not functional, in which case the remaining functional automated drive controller assumes control of the vehicle and guides the vehicle to a standstill.

\* \* \* \* \*